(12) United States Patent
Bartoszek et al.

(10) Patent No.: US 10,418,879 B2
(45) Date of Patent: Sep. 17, 2019

(54) POWER TOOL USER INTERFACES (71) Applicant: INGERSOLL-RAND COMPANY, Davidson, NC (US)

(72) Inventors: Jason Christopher Bartoszek, Bethlehem, PA (US); Vikram Madineni, Somerset, NJ (US); Joshua Odell Johnson, Allentown, PA (US); Sean C. Ely, Flemington, NJ (US); Douglas Fornell Leavitt, Bethlehem, PA (US)

(73) Assignee: Ingersoll-Rand Company, Davidson, NC (US)

( * ) Notice: Subject to any disclaimer, the term of this patent is extended or adjusted under 35 U.S.C. 154(b) by 431 days.

(21) Appl. No.: 15/172,193

(22) Filed: Jun. 3, 2016

(65) Prior Publication Data

US 2016/0354912 A1 Dec. 8, 2016

Related U.S. Application Data (60) Provisional application No. 62/171,673, filed on Jun. 5, 2015.

(51) Int. Cl.
*B25F 5/00* (2006.01)
*B25F 5/02* (2006.01)
*H02K 7/14* (2006.01)

(52) U.S. Cl.
CPC .............. *H02K 7/145* (2013.01); *B25F 5/001* (2013.01); *B25F 5/02* (2013.01)

(58) Field of Classification Search
CPC ...... F16D 48/064; F16D 48/06; B25D 16/006; B25D 16/003; B23Q 17/00; B23Q 17/008;
(Continued)

(56) References Cited

U.S. PATENT DOCUMENTS 1,495,153 A   5/1924   Benjamin
2,543,979 A   3/1951   Maurer
(Continued)

FOREIGN PATENT DOCUMENTS

CN   1583370 A    2/2005
CN   103481251 A   1/2014
(Continued)

OTHER PUBLICATIONS

International Search Report dated Oct. 7, 2016; PCT/US2016/035807; Filing Date Jun. 3, 2016.
(Continued)

*Primary Examiner* — Hemant Desai
*Assistant Examiner* — Veronica Martin
(74) *Attorney, Agent, or Firm* — Jones IP Group; Wayne A. Jones (57) ABSTRACT

A hand-held power tool is provided that includes a housing assembly to support a motor. An output spindle protrudes from an output end of the housing assembly such that the output spindle rotates in response to a rotation of the motor. A user interface is located at the housing assembly opposite the output spindle. The user interface is configured to select one of a plurality of modes of operation of the hand-held power tool to regulate power supplied to the motor.

18 Claims, 3 Drawing Sheets

(58) Field of Classification Search
CPC ...... B23Q 17/10; B23Q 17/007; H02K 7/145; H02K 11/215; B25C 1/06; B25F 5/00; B25F 5/001; G01D 5/244; G01D 5/145
USPC ........................................................ 173/217
See application file for complete search history.

(56) References Cited

U.S. PATENT DOCUMENTS

| | | | |
|---|---|---|---|
| 2,637,825 A | 5/1953 | Moore | |
| 2,858,701 A * | 11/1958 | Willcox | B23D 67/00 15/23 |
| 3,225,232 A | 12/1965 | Turley et al. | |
| 3,336,490 A | 8/1967 | Yelpo et al. | |
| 3,353,078 A | 11/1967 | Maynard | |
| 3,440,465 A | 4/1969 | Pratt et al. | |
| 3,611,095 A | 10/1971 | Schnizler | |
| 3,894,254 A | 7/1975 | Holther, Jr. | |
| 4,032,806 A | 6/1977 | Seely | |
| 4,156,821 A | 5/1979 | Kurome et al. | |
| 4,284,109 A | 8/1981 | Kilmer et al. | |
| 4,292,571 A | 9/1981 | Cuneo | |
| 4,307,325 A | 12/1981 | Saar | |
| 4,412,158 A | 10/1983 | Jefferson et al. | |
| 4,454,459 A | 6/1984 | Huber | |
| 4,506,743 A | 3/1985 | Grossmann | |
| 4,510,404 A | 4/1985 | Barrett et al. | |
| 4,513,381 A | 4/1985 | Houser, Jr. et al. | |
| 4,791,833 A | 12/1988 | Sakai et al. | |
| 4,838,361 A * | 6/1989 | O'Toole | B23Q 11/04 173/182 |
| 4,893,942 A | 1/1990 | Stottmann | |
| 4,991,472 A | 2/1991 | Hollingsworth | |
| 5,105,130 A * | 4/1992 | Barker | B23B 45/02 318/268 |
| 5,138,243 A | 8/1992 | Kress et al. | |
| 5,200,658 A | 4/1993 | Kohno et al. | |
| 5,203,242 A | 4/1993 | Hansson | |
| 5,365,155 A | 11/1994 | Zimmerman | |
| 5,473,519 A | 12/1995 | McCallops et al. | |
| 5,525,842 A | 6/1996 | Leininger | |
| 5,526,460 A | 6/1996 | DeFrancesco et al. | |
| 5,531,278 A | 7/1996 | Lin | |
| 5,561,734 A | 10/1996 | Simonsen et al. | |
| 5,712,543 A | 1/1998 | Sjostrom | |
| 5,714,861 A | 2/1998 | Hansen et al. | |
| 5,738,177 A | 4/1998 | Schell et al. | |
| 5,804,936 A | 9/1998 | Brodsky et al. | |
| 5,992,257 A | 11/1999 | Nemetz et al. | |
| 5,998,897 A | 12/1999 | Bosten et al. | |
| 6,037,724 A | 3/2000 | Buss et al. | |
| 6,043,575 A | 3/2000 | Ghode | |
| 6,318,189 B1 | 11/2001 | Donaldson | |
| 6,353,705 B1 | 3/2002 | Capps et al. | |
| 6,511,200 B2 | 1/2003 | Matsunaga | |
| 6,598,684 B2 | 7/2003 | Watanabe | |
| 6,607,041 B2 * | 8/2003 | Suzuki | B25B 21/02 173/11 |
| 6,508,313 B1 | 12/2003 | Carney et al. | |
| 6,691,796 B1 * | 2/2004 | Wu | B25D 16/006 173/109 |
| 6,713,905 B2 | 3/2004 | Hirschburger et al. | |
| 6,725,945 B2 | 4/2004 | Sugimoto et al. | |
| 6,814,461 B2 | 11/2004 | Minalga | |
| 6,933,632 B2 | 8/2005 | Braml et al. | |
| 6,945,337 B2 | 9/2005 | Kawai et al. | |
| 6,968,908 B2 | 11/2005 | Tokunaga et al. | |
| 7,058,291 B2 | 6/2006 | Weaver et al. | |
| 7,090,032 B2 | 8/2006 | Wada et al. | |
| 7,109,675 B2 | 9/2006 | Matsunaga et al. | |
| 7,112,934 B2 | 9/2006 | Gilmore | |
| 7,152,329 B2 | 12/2006 | Kondo et al. | |
| 7,155,986 B2 | 1/2007 | Kawai et al. | |
| 7,236,243 B2 | 6/2007 | Beecroft et al. | |
| 7,237,622 B2 | 7/2007 | Liao | |
| 7,322,427 B2 * | 1/2008 | Shimma | B25D 16/006 173/170 |
| 7,334,648 B2 | 2/2008 | Arimura | |
| 7,397,153 B2 | 7/2008 | Buck et al. | |
| 7,419,013 B2 | 9/2008 | Sainomoto et al. | |
| 7,494,437 B2 | 2/2009 | Chen | |
| 7,588,094 B2 * | 9/2009 | Lin | B25B 21/00 173/178 |
| 7,607,493 B2 * | 10/2009 | Erhardt | B25D 16/006 173/216 |
| 7,677,752 B2 | 3/2010 | Tadokoro et al. | |
| 7,705,482 B2 | 4/2010 | Leininger | |
| 7,717,192 B2 * | 5/2010 | Schroeder | B25D 16/006 173/104 |
| 7,839,112 B2 | 11/2010 | Wei | |
| 7,882,899 B2 | 2/2011 | Borinato et al. | |
| 7,928,615 B2 | 4/2011 | Miyashita | |
| 7,942,211 B2 * | 5/2011 | Scrimshaw | B23B 31/123 173/176 |
| 8,016,048 B2 | 9/2011 | Ueda et al. | |
| 8,122,971 B2 | 2/2012 | Whitmire et al. | |
| 8,210,275 B2 | 7/2012 | Suzuki et al. | |
| 8,267,924 B2 * | 9/2012 | Zemlok | A61B 17/068 606/1 |
| 8,303,449 B2 | 11/2012 | Ho et al. | |
| 8,317,350 B2 | 11/2012 | Friedman et al. | |
| 8,371,708 B2 | 2/2013 | Nagasaka et al. | |
| 8,381,830 B2 | 2/2013 | Puzio et al. | |
| 8,415,911 B2 | 4/2013 | Lau et al. | |
| 8,430,180 B2 | 4/2013 | Gumpert et al. | |
| 8,430,182 B2 * | 4/2013 | Soika | B25D 16/00 173/162.1 |
| 8,496,366 B2 | 7/2013 | Leong | |
| 8,511,399 B2 * | 8/2013 | Kunz | B25D 17/00 173/170 |
| 8,528,658 B2 | 9/2013 | Roehm et al. | |
| 8,607,893 B2 | 12/2013 | Kumagai et al. | |
| 8,636,081 B2 * | 1/2014 | Ludy | B25D 11/04 173/128 |
| 8,714,888 B2 * | 5/2014 | Bean | B25F 5/001 173/216 |
| 8,727,034 B2 | 5/2014 | Leong et al. | |
| 8,757,286 B2 | 6/2014 | Nagasaka et al. | |
| 8,800,679 B2 | 8/2014 | Eshleman et al. | |
| 8,820,430 B2 * | 9/2014 | Walker | B25B 21/00 173/47 |
| 8,939,228 B2 * | 1/2015 | Kondo | B25D 11/102 173/178 |
| 9,089,954 B2 * | 7/2015 | Roehm | B25F 5/001 |
| 9,193,055 B2 * | 11/2015 | Lim | B25F 5/001 |
| 9,321,156 B2 * | 4/2016 | Eshleman | B25B 21/00 |
| 9,385,352 B2 * | 7/2016 | Nguyen | H01M 2/1055 |
| 9,463,563 B2 * | 10/2016 | Takeuchi | B25D 16/006 |
| 9,566,692 B2 * | 2/2017 | Seith | B25B 13/06 |
| 9,827,660 B2 * | 11/2017 | Blum | B25D 16/006 |
| 9,950,417 B2 * | 4/2018 | Ito | B25F 5/00 |
| 10,046,450 B2 * | 8/2018 | Bernhart | G05G 1/10 |
| 2002/0014343 A1 * | 2/2002 | Funfer | B25D 16/006 173/48 |
| 2002/0096342 A1 | 7/2002 | Milbourne | |
| 2002/0131267 A1 | 9/2002 | Van Osenbruggen | |
| 2003/0121679 A1 | 7/2003 | Taga | |
| 2003/0149508 A1 | 8/2003 | Watanabe | |
| 2005/0183870 A1 | 8/2005 | Wada et al. | |
| 2005/0224242 A1 * | 10/2005 | Britz | B25D 16/006 173/15 |
| 2005/0257945 A1 | 11/2005 | Justis | |
| 2006/0012584 A1 | 1/2006 | Vassallo et al. | |
| 2006/0237205 A1 | 10/2006 | Sia et al. | |
| 2007/0180959 A1 | 8/2007 | Tokunaga et al. | |
| 2007/0193762 A1 | 8/2007 | Arimura et al. | |
| 2008/0025017 A1 | 1/2008 | Tadokoro | |
| 2008/0032848 A1 | 2/2008 | Ho | |
| 2008/0048650 A1 | 2/2008 | Islam et al. | |
| 2008/0122302 A1 | 5/2008 | Leininger | |
| 2009/0188688 A1 * | 7/2009 | Gumpert | B25D 16/003 173/104 |
| 2009/0221222 A1 | 9/2009 | Lo et al. | |

(56) References Cited

U.S. PATENT DOCUMENTS

| | | | |
|---|---|---|---|
| 2010/0200380 A1* | 8/2010 | Staas | B25D 16/006 200/293 |
| 2010/0326686 A1* | 12/2010 | Leong | B25B 21/00 173/48 |
| 2011/0048750 A1* | 3/2011 | Leong | B25B 21/00 173/47 |
| 2011/0188232 A1 | 8/2011 | Friedman et al. | |
| 2011/0248650 A1 | 10/2011 | Sterling et al. | |
| 2012/0205131 A1* | 8/2012 | Furusawa | B25D 16/006 173/2 |
| 2012/0234568 A1* | 9/2012 | Schnell | B25D 16/003 173/170 |
| 2012/0279736 A1 | 11/2012 | Tanimoto et al. | |
| 2012/0318549 A1 | 12/2012 | Nagasaka et al. | |
| 2013/0062086 A1 | 3/2013 | Ito et al. | |
| 2013/0075121 A1 | 3/2013 | Nakamura et al. | |
| 2013/0087355 A1 | 4/2013 | Oomori et al. | |
| 2013/0153253 A1* | 6/2013 | Ludy | B25D 11/04 173/104 |
| 2013/0161040 A1 | 6/2013 | Tomayko et al. | |
| 2013/0206435 A1* | 8/2013 | Papp | B25F 5/001 173/20 |
| 2013/0228356 A1 | 9/2013 | Hayes et al. | |
| 2013/0267374 A1 | 10/2013 | Blum et al. | |
| 2013/0269961 A1 | 10/2013 | Lim et al. | |
| 2013/0270932 A1 | 10/2013 | Hatfield et al. | |
| 2013/0274797 A1 | 10/2013 | Nicholas et al. | |
| 2013/0284480 A1 | 10/2013 | Horie et al. | |
| 2013/0313925 A1 | 11/2013 | Mergener et al. | |
| 2013/0327552 A1 | 12/2013 | Lovelass et al. | |
| 2014/0036482 A1 | 2/2014 | Vanko et al. | |
| 2014/0069676 A1 | 3/2014 | Abante et al. | |
| 2014/0100687 A1* | 4/2014 | Ekstrom | G01D 5/147 700/160 |
| 2014/0138111 A1* | 5/2014 | Takeuchi | B25D 16/006 173/48 |
| 2014/0182869 A1 | 7/2014 | Kumagai et al. | |
| 2014/0182870 A1* | 7/2014 | Herr | B25D 11/104 173/94 |
| 2014/0338503 A1 | 11/2014 | Beer et al. | |
| 2015/0122523 A1* | 5/2015 | Yamamoto | B25F 5/001 173/2 |
| 2015/0122524 A1* | 5/2015 | Papp | B25F 5/001 173/20 |
| 2015/0202759 A1* | 7/2015 | Wang | B25D 16/006 173/47 |
| 2015/0328760 A1* | 11/2015 | Ikuta | B25D 11/00 173/117 |
| 2016/0354889 A1* | 12/2016 | Ely | B25B 21/02 |
| 2016/0354905 A1* | 12/2016 | Ely | B25B 21/008 |

FOREIGN PATENT DOCUMENTS

| | | | |
|---|---|---|---|
| CN | 103989497 A | 8/2014 | |
| CN | 104162880 A | 11/2014 | |
| CN | 104676315 | 6/2015 | |
| DE | 19518591 | 12/1996 | |
| EP | 0271903 | 6/1988 | |
| EP | 0585541 | 5/1993 | |
| EP | 911119 A2 | 4/1999 | |
| EP | 1426989 A1 | 6/2004 | |
| EP | 1524085 A2 | 4/2005 | |
| EP | 1595649 A2 | 11/2005 | |
| EP | 1595650 A2 | 11/2005 | |
| EP | 1867438 A2 | 12/2007 | |
| EP | 2075094 | 12/2007 | |
| EP | 1982798 A2 | 10/2008 | |
| EP | 1207016 B1 | 1/2009 | |
| EP | 2042271 A2 | 4/2009 | |
| EP | 1524084 B1 | 8/2009 | |
| EP | 1447177 B1 | 4/2011 | |
| EP | 2256899 B1 | 8/2011 | |
| GB | 752251 A | 7/1956 | |
| GB | 1068990 | 5/1967 | |
| GB | 1413293.0 * | 7/2014 | |
| GB | 2514261 A | 11/2014 | |
| JP | 8193896 A | 7/1996 | |
| JP | 8294878 A | 11/1996 | |
| JP | 2000218561 A | 8/2000 | |
| JP | 2002331427 A | 11/2002 | |
| JP | 2004202600 A | 7/2004 | |
| JP | 2004239681 A | 8/2004 | |
| JP | 2005254400 A | 9/2005 | |
| JP | 2006272488 A | 10/2006 | |
| JP | 2006312210 A | 11/2006 | |
| JP | 2009269137 A | 11/2009 | |
| JP | 2010012585 A | 1/2010 | |
| JP | 2011-230272 | 4/2010 | |
| JP | 2011031369 A | 2/2011 | |
| JP | 2011067910 A | 4/2011 | |
| JP | 2012035358 A | 2/2012 | |
| RU | 2360786 C2 | 7/2009 | |
| TW | 2012/31843 | 8/2012 | |
| WO | WO1998053959 A1 | 12/1998 | |
| WO | WO2000064639 A1 | 11/2000 | |
| WO | WO2001044776 A1 | 6/2001 | |
| WO | 01/54865 A2 | 8/2001 | |
| WO | WO0230624 | 4/2002 | |
| WO | WO2004029569 A1 | 4/2004 | |
| WO | WO2009011633 A1 | 1/2009 | |
| WO | WO2010110716 A1 | 9/2010 | |
| WO | WO2011099487 A1 | 8/2011 | |
| WO | WO2011102559 A1 | 8/2011 | |
| WO | WO2012002578 A1 | 1/2012 | |
| WO | WO2012023452 A1 | 2/2012 | |
| WO | WO2013/037325 | 3/2013 | |
| WO | WO 2013164905 | 11/2013 | |
| WO | WO 2013/183535 | 12/2013 | |
| WO | WO2014/108110 | 7/2014 | |
| WO | WO 2014108110 A1 * | 7/2014 | B25F 5/02 |
| WO | WO2014/124859 | 8/2014 | |

OTHER PUBLICATIONS

International Search Report dated Sep. 6, 2016; PCT/US2016/035681; Filing Date Jun. 3, 2016.

International Search Report dated Aug. 26, 2016; PCT/US2016/035665; Filing Date Jun. 3, 2016.

International Search Report dated Sep. 14, 2016; PCT/US2016/035674; Filing Date Jun. 3, 2016.

International Search Report dated Aug. 31, 2016; PCT/US2016/035698; Filing Date Jun. 3, 2016.

International Search Report dated Sep. 2, 2016; PCT/US2016/35797; Filing Date Jun. 3, 2016.

Office Action dated Oct. 6, 2017; U.S. Appl. No. 15/172,247.

CN 104676315 Dated Jun. 3, 2015, Chou; English Translation.

CLIPSTRIP™ Aqua—Waterproof & Rechargeable LED Strip Light, from: http://www.cliplight.com/automotive/lighting/compact-series/clipstrip-aqu a/; Dated Sep. 10, 2014.

ATD Tools 80335 35W Cob LED Worklight w/Stand, from: https://www.google.com/shopping/product/16993246027546592360?q=COB+LED+flashlight&espv= 2&biw=1680&bih=949&bav=on.2 ; Dated Sep. 10, 2014.

3W Portable Rechargeable LED Work Light with Magnetic Base Power Car Charger, from: http://www.ebay.com/itm/like/141277021128?1pid=82 ; Dated Sep. 10, 2014.

ATD 80304 Saber 3Watt Cob LED Strip Light Plus 2.4watt Top Light, from: https://www.google.com/shopping/product/38191055578223770488?q=COB+LED+flashlight&espv=2&biw=1680&bih=94 9&bav=on.2 ; Dated Sep. 10, 2014.

Ac85-265v Or Dc12v/24v Epistar Cob Led Chip Led Work Flashlight, from: http://www.alibaba.com/product-detail/AC85-265v-or-dc12v-24v-epistar_ 1450867344.html ; Dated Sep. 10, 2014.

Hot Sell High Brightness Cob Flashlight, from http://www.alibaba.com/product-detail/Hot-sell-high-brightn ess-COB-Flashlight_1850789033.html ; Dated Sep. 10, 2014.

Makita Flashlight, ML140, 14.4V, from http://www.globalindustrial.com/p/tools/portable-work-lights/Flashl ights-Handheld/flashlight-ml140-144 v ; Dated Sep. 10, 2014.

(56) References Cited

OTHER PUBLICATIONS

Laser-Flex 2D by Penn Tool Co.; Retrieved on Sep. 2, 2014 from: http://www.penntoolco.com/catalog/products/ products.cfm?categoryID=1351 ; Dated Sep. 2, 2014.
Pelican Remote Area Lighting; Retrieved on Sep. 2, 2014 from: http://www.grainger.com/product/PELICAN-Remot e-Area-Lighting-System- 5RZY8?s_pp=false&picUrl=//static.grainger.com /rp/s/is/image/Grainger/5RZY8_AS01? $smthumb$ ; Dated Sep. 2, 2014.
SYCLONE by Streamlight; Retrieved on Sep. 2, 2014 from: http://www.smokesign.com/syrefl.html ; Dated Sep. 2, 2014.
Ace LED Work Light with Stand; Retrieved on Sep. 2, 2014 from: http://www.acehardware.com/product/index.jsp ?productId=19607576 ; Dated Sep. 2, 2014.
Zoro LED Worklight by Cooper; Retrieved on Sep. 2, 2014 from: http://www.zoro.com/i/G4585287/?utm_source=g oogle_shopping&utm_medium=cpc&utm_campaign=Google_Shopping_Feed&gclid= CPm46JHwwsACFRMLMgod_H8AyA ; Dated Sep. 2, 2014.
Jimmy Houston Folding Flip Light; Retrieved on Sep. 2, 2014 from: http://www.walmart.com/ip/20512279?wm1sp artner=w1pa&adid=22222222227014895251&w10=&w11=g&w12=c&w13=40969534952 &w14=&w15=pla&w16=78912422192&veh=sem#ProductDetail ; Dated Sep. 2, 2014.
"LifeBox Series by Streamlight"; Retrieved on Sep. 2, 2014 from: http://www.streamlight.com/en-ca/product/c lass.html?cid=6 ; Dated Sep. 2, 2014.
Dial a Speed; Taken from the Internet on Aug. 29, 2014 from http://makezine.com/projects/the-dial-a-spee d/.
Festool RO 90 DX; Taken from the Internet on Aug. 29, 2014 from http://www.thewoodnerd.com/reviews/festo olRO90DX.html.
"Air Impact Wrench 588A1 Maintenance Information"; Ingersoll-Rand, Nov. 1, 2007.
International Search Report dated Sep. 25, 2018; EP16804498.0; Filing Date Jun. 3, 2016.
International Search Report; PCT/US2016/035665; Filing Date Jun. 3, 2016; dated Aug. 26, 2016.
2145QiMax ¾' Air Impactool "Maximum Impact"; Ingersoll-Rand, Aug. 26, 2014.
U.S. Appl. No. 15/172,214, Power Tool Housings, filed Jun. 3, 2013.
U.S. Appl. No. 15/172,247, Lighting Systems for Power Tools, filed Jun. 3, 2016.
U.S. Appl. No. 15/172,284, Power Tool User Interfaces, filed Jun. 3, 2016.
U.S. Appl. No. 15/172,420, Impact Tools With Ring Gear Alignment Features, filed Jun. 3, 2016.
U.S. Appl. No. 15/172,501, Power Tools With User-Selectable Operational Modes, filed Jun. 3, 2016.
International Search Report dated Jan. 3, 2019; CN 201680031397.8; Filing Date Jun. 3, 2016.
Europea Exam report dated May 29, 2019; EP 16804498.0; Filing Date Jun. 3, 2016.

* cited by examiner

POWER TOOL USER INTERFACES

RELATED APPLICATION

The present application relates to and claims priority to U.S. Provisional Patent Application Ser. No. 62/171,673, filed on Jun. 5, 2015, entitled "Power Tool User Interfaces." The subject matter disclosed in that provisional application is hereby expressly incorporated into the present application.

TECHNICAL FIELD AND SUMMARY

The present disclosure relates, generally, to user interfaces for power tools and, more particularly, to user interfaces for selecting various modes of operation of a power tool.

User interfaces for power tools sometimes include controls for regulating power supplied to electric motors of the power tools. For instance, such user interfaces may include one or more switches or knobs that are movable between positions to adjust the power supplied to the electric motor. Some power tools may include features that guide movement of the switches between the positions and provide feedback to a user regarding the positional state of the switches. Such features are typically provided entirely on the power tool housings. Providing such features on components of electric power tools other than power tool housings may reduce the size of the power tools, and therefore provide packaging benefits, among other benefits.

Accordingly, an illustrative embodiment of the present disclosure provides a hand-held power tool which comprises a housing assembly, an output spindle, a motor endbell, and a user interface. The housing assembly supports an electric motor having a rotor configured to rotate when the electric motor is supplied with power. The output spindle protrudes from an output end of the housing assembly, and is functionally coupled to the rotor such that the output spindle rotates in response to a rotation of the rotor. The motor endbell is located on the housing assembly adjacent the electric motor and opposite the output spindle. The user interface is located on the motor endbell opposite the output spindle and is configured to select one of a plurality of modes of operation of the hand-held power tool to regulate the power supplied to the electric motor. The user interface also includes a control knob accessible from exterior of the housing assembly. The control knob is rotatable about a knob axis to a plurality of mode positions that control a plurality of operation modes. The control knob also includes a lever that is configured to be pivoted by a hand. The motor endbell further includes piloting features located adjacent to and interact with the control knob to guide rotation of the control knob relative to the housing assembly about the knob axis to the plurality of mode positions. The piloting features include an arcuate guide about which the control knob rotates such that the control knob cooperatively defines the shape of the arcuate guide. The motor endbell further includes indexing features located on the arcuate guide as a plurality of selective stops. Each of the plurality of selective stops is configured to interact with at least one arm on the control knob to provide haptic feedback when the control knob is rotated to each of the plurality of selective stops to define the plurality of mode positions and indicate the positional states of the control knob corresponding to the plurality of operation modes.

In the above and other embodiments of the present disclosure may also comprise: the at least one arm being a plurality of arms; the plurality of selective stops being a plurality of detents; the motor endbell being configured to position the rotor relative to a stator of the electric motor; the arcuate guide of the endbell including two end stops with the plurality of selective stops located between the two end stops; the arcuate guide being circular; the plurality of detents interconnects with and extends radially outward from the knob axis, and the detents are spaced apart from each other; the arcuate guide includes a reduced radius section with respect to the knob axis at a location adjacent the plurality of detents; the knob axis is located parallel to an axis of rotation of the rotor; the control knob axis is located coincident to an axis of rotation of the rotor; the control knob is also located adjacent to a cap configured to shroud an interior space at an end of the hand-held power tool opposite the output end, wherein the control knob is rotatable relative to the cap to the plurality of mode positions; the control knob being rotatable to select one of the plurality of operation modes to regulate a maximum power supplied to the electric motor when a trigger, spaced apart from the control knob, is depressed; the plurality of operation modes being selected from the group consisting of a first power level, a second power level that is greater than the second power level, a third power level which is greater than the second power level, and a fourth power level that is greater than the third power level; the control knob including an arcuate exterior wall that extends at least partway around the knob axis and is connected to first and second interior walls, wherein an inner surface of the arcuate exterior wall is also connected to an outer surface of the first interior wall and to an outer surface of the second interior wall, wherein opposite ends of the arcuate exterior wall extend radially inward toward the knob axis to connect to the outer surfaces of the first and second interior walls, respectively, and wherein the inner surface of the arcuate exterior wall is spaced apart from and positioned radially outward of the outer surfaces of the first and second interior walls between the opposite ends of the arcuate exterior wall; the control knob including an interior cavity, wherein the piloting and indexing features of the endbell are received in the interior cavity; the at least one arm are first and second arms each configured to engage one of the selective stops that define the plurality of mode positions for the control knob to provide feedback indicating the positional state of the control knob at one of the plurality of operation modes; and the first and second arms are cantilevered arms coupled to the control knob and extend radially inward therefrom toward the knob axis, wherein when the control knob being rotated to one of the plurality of mode positions, wherein interference causes the first and second arms to be deflected radially outward away from the knob axis such that the deflection is detectable by the hand touching the control knob which provide the haptic feedback indicating the positional state of the control knob.

Another illustrative embodiment of the present disclosure provides a hand-held power tool which comprises a housing assembly, an output spindle, a motor endbell, an electric motor, and a user interface. The housing assembly supports the electric motor having a rotor configured to rotate when the electric motor is supplied with power. The output spindle protrudes from an output end of the housing assembly and is functionally coupled to the rotor such that the output spindle rotates in response to a rotation of the rotor. The motor endbell is located on the housing assembly adjacent the electric motor and opposite the output spindle. The user interface is located on the motor endbell opposite the output spindle and is configured to select one of a plurality of modes of operation of the hand-held power tool to regulate power supplied to the electric motor.

In the above and other embodiments of the present disclosure may also comprise: the user interface including a control knob accessible from exterior of the housing assembly; the control knob being rotatable about a knob axis to a plurality of mode positions that control a plurality of operation modes; the control knob includes a lever that is configured to be pivoted by a hand; the motor endbell including piloting features located adjacent to and interact with the control knob to guide rotation of the control knob relative to the housing assembly about the knob axis to the plurality of mode positions, wherein the piloting features include an arcuate guide about which the control knob rotates such that the control knob cooperatively defines the shape of the arcuate guide; the motor endbell further includes indexing features located on the arcuate guide as a plurality of selective stops, wherein each of the plurality of selective stops being configured to interact with at least one arm on the control knob to provide haptic feedback when the control knob is rotated to the plurality of selective stops to define the plurality of mode positions which indicate positional states of the control knob corresponding to the plurality of operation modes; the endbell including a piloting feature that includes a slot configured to receive a corresponding key on the control knob, wherein as the control knob is rotated between the plurality of mode positions; and the user interface being selected from the group consisting of a dial, push button, switch, lever, and touch screen.

Another illustrative embodiment of the present disclosure provides a hand-held power tool which comprises a housing assembly, an output spindle, and a user interface. The housing assembly supports an electric motor having a rotor configured to rotate when the electric motor is supplied with power. The output spindle protrudes from an output end of the housing assembly and is functionally coupled to the rotor such that the output spindle rotates in response to a rotation of the rotor. The user interface is located at the housing assembly opposite the output spindle and is configured to select one of a plurality of modes of operation of the hand-held power tool 10 to regulate power supplied to the electric motor. The user interface is selected from the group consisting of a control knob, dial, push button, switch, lever, and touch screen. Lastly, the user interface is accessible from exterior of the housing assembly.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
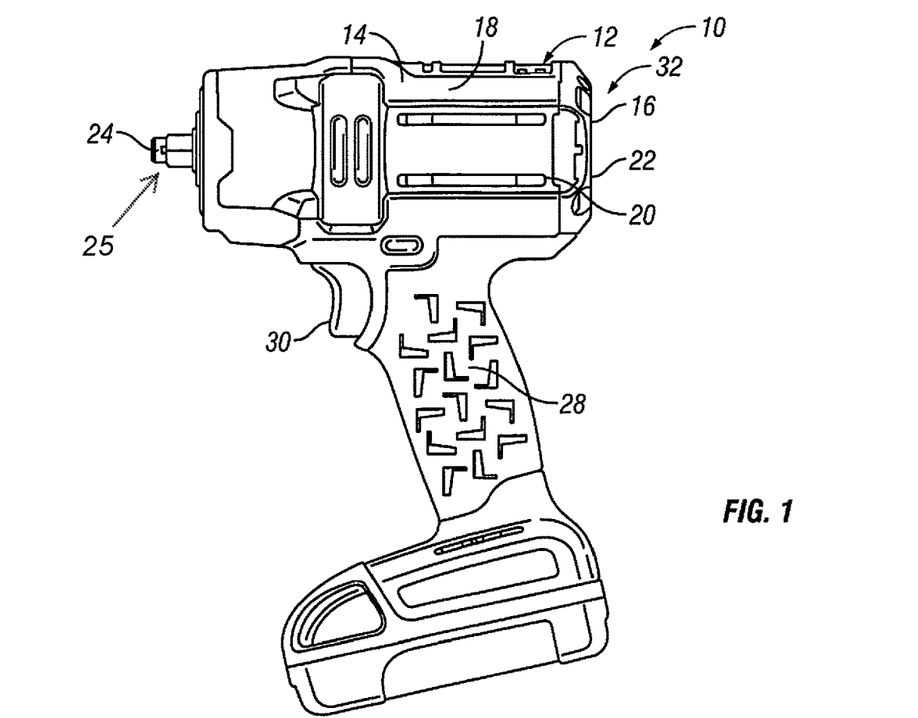
FIG. 1 is a side elevation view of an illustrative power tool including a tool housing.

Referring now to FIG. 1, an illustrative power tool 10 is shown. The power tool 10 is illustratively embodied as a cordless, electric power tool (in particular, an electric, pistol-style impact tool). In various embodiments, the power tool 10 may be embodied as a pistol-grip impact tool, an in-line impact tool, or an angle impact tool, such as a right-angle impact tool. It should be appreciated, however, that in other embodiments, the power tool may be embodied as a cordless, electric power tool that does not include an impact mechanism, such as an electric drill, drill driver, ratchet, saw, or the like.

The illustrative power tool 10 as shown in FIG. 1 also includes a tool housing 12. Tool housing 12 includes a body 14 and a cap 16. The body 14 defines an interior space 18 in which an electric motor 20 of the tool 10 is positioned. The cap 16 is coupled to the body 14 when the tool 10 is assembled to close off the interior space 18 and define an end 22 that is positioned opposite an output end 24 (which includes an output spindle 25) of the tool 10. The cap 16 is coupled to the body 14 using fasteners 26 (best seen in FIG. 2) that extend through the cap 16 and into the interior space 18.

Figure 2:
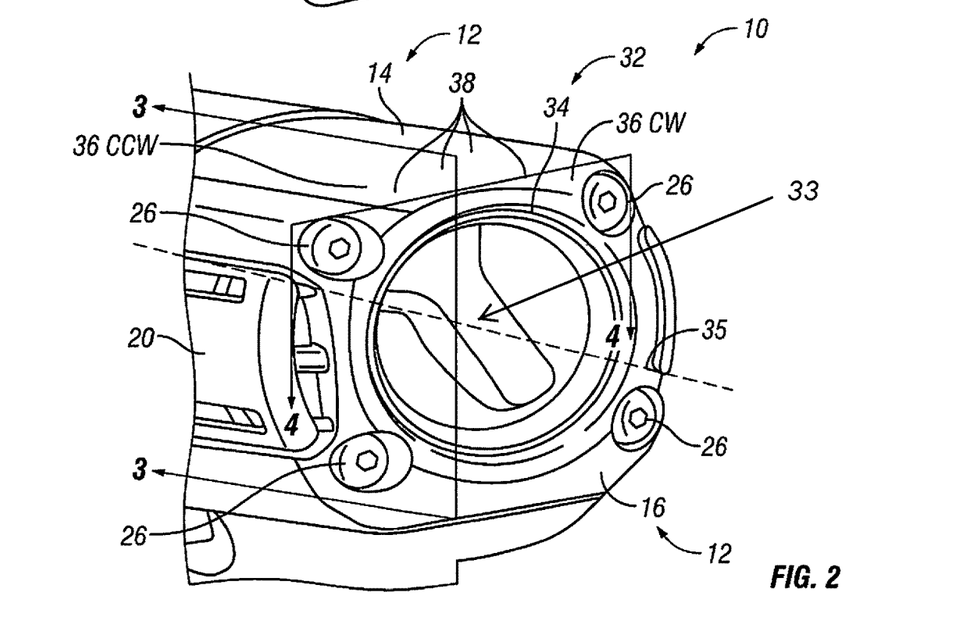
FIG. 2 is a perspective view of a user interface provided on a rear portion of the tool housing of the power tool of FIG. 1 with remaining portions of the tool housing omitted for the sake of clarity.

The tool housing 12 defines a handle 28 on which a trigger 30 is provided as shown in FIG. 1. The trigger 30 is used to turn the electric motor 20 on/off in use of the tool 10. A user interface 32 spaced from the trigger 30 is also provided on the housing 12, specifically on the cap 16, as best seen in FIG. 2. In the illustrative embodiment, the user interface 32 is used to select one of a plurality of modes of operation of the power tool 10. For instance, in some embodiments, the user interface 32 may be used to select a particular mode of operation from among those described in U.S. Provisional Patent Application Ser. No. 62/171,504, filed Jun. 5, 2015. In other embodiments, the user interface 32 may simply regulate the maximum power supplied to the electric motor 20 when the trigger 30 is fully depressed in use of the tool 10.

Referring now to FIG. 2, the user interface 32 is shown in greater detail. The user interface 32 is supported by the tool housing 12 and is illustratively embodied as, or otherwise includes, a control knob 34 which may further comprise a lever 33. It should be appreciated, however, that in other embodiments, the user interface 32 may be embodied as a dial, push button, switch, or other control, and the dial, push button, switch, or other control, as well as components associated therewith, may be supported by the tool housing 12.

The control knob 34 is accessible from the exterior of the tool housing 12, and the control knob 34 is engaged with the cap 16 (best seen in FIG. 3) and rotatable relative thereto about a knob axis 35 between a number of mode positions 36. Operation of the electric motor 20 when the control knob 34 is in one of the mode positions 36 is different from the operation of the electric motor 20 when the control knob 34 is in any of the other mode positions 36. In the illustrative embodiment, the mode positions 36 include four different positions. It should be appreciated, however, that in other embodiments, the control knob 34 may be moved between more or less than four mode positions 36. It is also contemplated that, in other embodiments, the position of the control knob 34 may be used to control other features and/or functions of the power tool 10 (additionally or alternatively to control of the motor 20).

Figure 3:
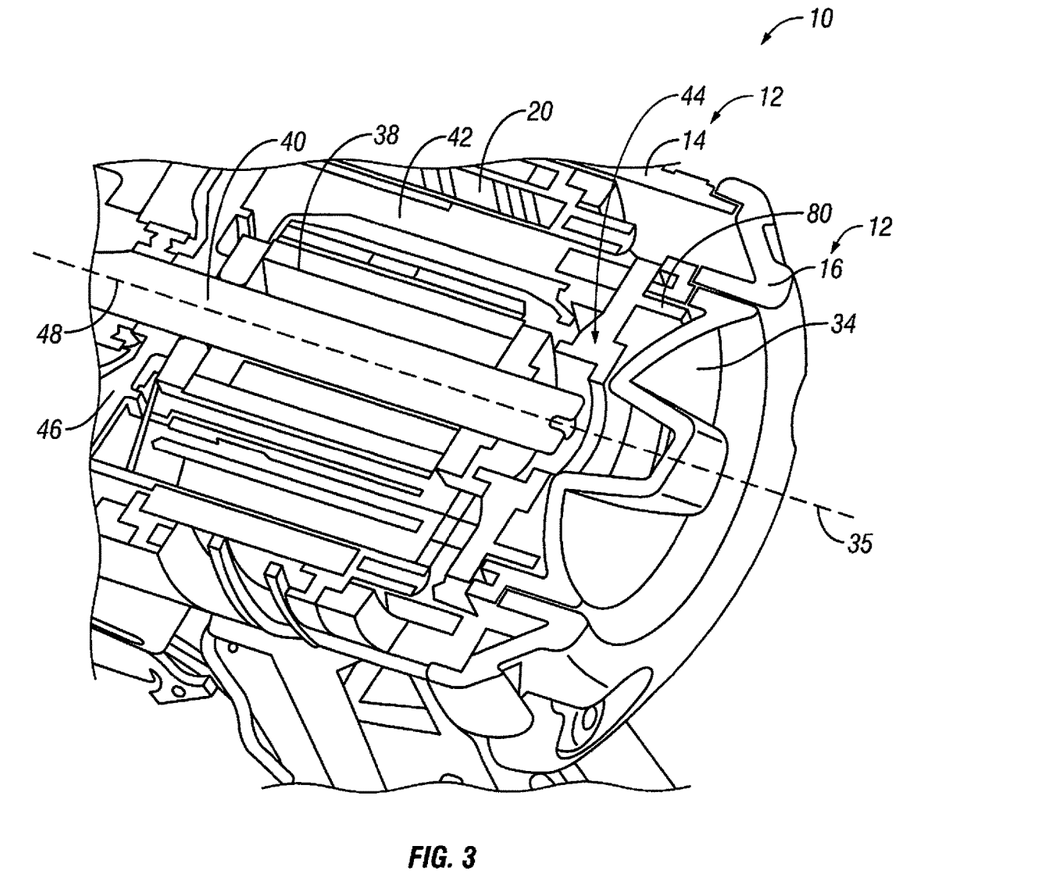
FIG. 3 is a magnified sectional view, taken about line 3-3 of FIG. 2, of various components supported by the rear portion of the tool housing including an electric motor.

Referring now to FIG. 3, the body 14 and the cap 16 of the tool housing 12 are broken away to show components of the electric motor 20. The electric motor 20 is illustratively embodied as a brushless DC electric motor. The electric motor 20 includes a rotor 38 configured to drive an output shaft 40 to output mechanical power and a stationary component (i.e., a stator) 42 that extends around the rotor 38.

The motor 20 also includes an endbell 44 that abuts the control knob 34 and an endbell 46 that is spaced from the endbell 44 and positioned closer to the output end 24 of the tool 10 than the endbell 44, as shown in FIG. 3. The rotor 38 and the stator 42 are positioned between the endbells 44, 46. The endbells 44, 46 cooperate to align the rotor 38 and the stator 42 so that the rotor 38 and the stator 42 extend parallel to a central axis 48 of the motor 20. The central axis 48 is illustratively parallel to the knob axis 35, and in some embodiments, the central axis 48 and the knob axis 35 may be coaxial.

Figure 4:
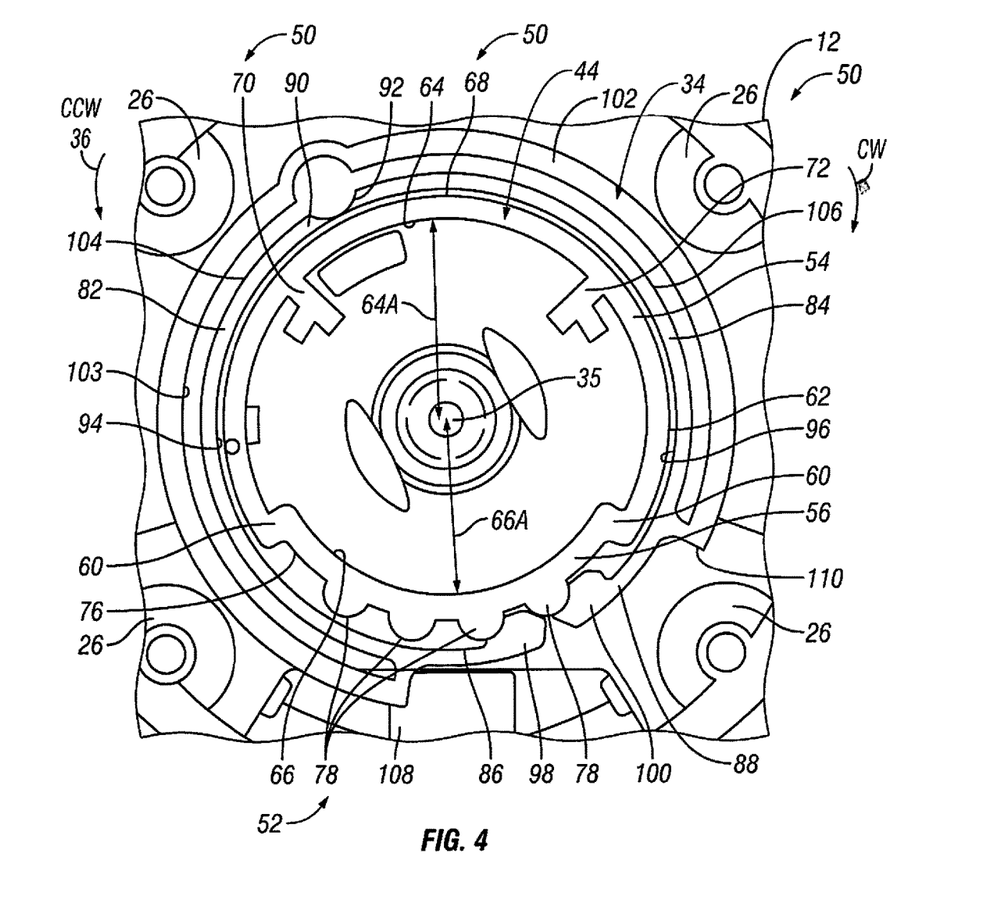
FIG. 4 is a magnified sectional view, taken about line 4-4 of FIG. 2, of various piloting and indexing features provided on a component of the electric motor that interfaces with the user interface.

The endbell 44 illustratively includes piloting features 50 and indexing features 52 that interface with the control knob 34, as best seen in FIG. 4. The piloting features 50 interface with the knob 34 to guide rotation of the control knob 34 relative to the tool housing 12 about the knob axis 35 between the mode positions 36. The indexing features 52 interface with the knob 34 to provide haptic feedback to the user as the knob 34 is rotated between the mode positions 36, thereby indicating the positional state of the knob 34 to the user.

The piloting and indexing features 50, 52 of the endbell 44 provide a number of benefits. For example, because the features 50, 52 are provided internally of the exterior of the housing 12, the size of the tool 10 may be reduce compared to the size of the tool 10 if the features 50, 52 were placed on the exterior of the housing 12. Additionally, because the features 50, 52 are formed on the endbell 44 located within the housing 12, additional components that might be required to provide the features 50, 52 on the outside of the housing 12 may be avoided, thereby decreasing the number of parts included in the tool 10.

Referring now to FIG. 4, the endbell 44 includes an arcuate piloting section 54 that extends partway around the knob axis 35. The endbell 44 also includes an arcuate indexing section 56 that extends partway around the knob axis 35. The sections 54, 56 are interconnected with one another through a pair of bridges 60 of the endbell 44 that extend radially inward toward the knob axis 35 from the section 54 to the section 56. Together, the sections 54, 56 and the bridges 60 define a ring 62 that extends continuously all the way around the knob axis 35. An inner surface 64 of the piloting section 54 is radially spaced from the knob axis 35 by a distance 64A. An inner surface 66 of the indexing section 56 is radially spaced from the knob axis 35 by a distance 66A that is illustratively less than the distance 64A.

The piloting section 54 of the endbell 44 includes an arcuate piloting surface 68 that is positioned opposite the inner surface 64 as shown in FIG. 4. As discussed in greater detail below, the piloting surface 68 is configured to engage the control knob 34 to support the control knob 34 and guide rotation of the knob 34 between the mode positions 36. As such, the piloting surface 68 provides one of the piloting features 50 of the endbell 44.

The piloting section 54 of the endbell 44 includes rotational stops 70, 72, also referred to herein as detents 70, 72, that are interconnected with and extend radially inward from the inner surface 64 toward the knob axis 35 as shown in FIG. 4. As discussed in greater detail below, the rotational stops 70, 72 are configured to engage the control knob 34 to constrain rotation of the knob 34 about the axis 35. As such, the rotational stops 70, 72 provide another of the piloting features 50 of the endbell 44.

The indexing section 56 of the endbell 44 includes an outer surface 76 that is positioned opposite the inner surface 66 as shown in FIG. 4. The indexing section 56 includes a number of arced protrusions or detents 78 that are interconnected with the outer surface 76 and extend radially outward therefrom away from the axis 35. As discussed in greater detail below, the protrusions or detents 78 are configured to engage the control knob 34 in each one of the mode positions 36 to provide feedback indicating the positional state of the knob 34. As such, the protrusions 78 provide indexing features 52 of the endbell 44.

Referring back to FIG. 3, the control knob 34 is arranged adjacent the endbell 44 so that the piloting and indexing features 50, 52 of the endbell 44 are received in an interior cavity 80 defined by the control knob 34. The interior cavity 80 is cooperatively defined by arcuate interior walls 82, 84 and cantilevered arms 98, 100 of the control knob 34 coupled to the respective walls 82, 84, as best seen in FIG. 4. As described in greater detail below, each of the arms 98, 100 is configured to engage one of the protrusions 78 in each of the mode positions 36 of the knob 34 to provide feedback indicating the positional state of the knob 34.

Referring again to FIG. 4, the interior walls 82, 84 of the knob 34 extend partway around the knob axis 35 from respective ends 86, 88 to respective ends 90, 92 that are positioned opposite the ends 86, 88 as shown in FIG. 4. The walls 82, 84 are not directly connected to one another. Ends 86, 88 are spaced from one another and ends 90, 92 are also spaced from one another. An inner surface 94 of the wall 82 extends between the ends 86, 90 of the wall 82, and an inner surface 96 of the wall 84 extends between the ends 88, 92 of the wall 84. The cantilevered arm 98 is coupled to the end 86 of the wall 82 and extends radially inward therefrom toward the axis 35. The cantilevered arm 100 is coupled to the end 88 of the wall 84 and extends radially inward therefrom toward the axis 35. The cantilevered arms 98, 100 are configured to cooperatively engage one of the protrusions 78 in each of the mode positions 36 of the knob 34, as described in greater detail below.

The control knob 34 includes an arcuate exterior wall 102 that extends partway around the knob axis 35 and is interconnected with each of the interior walls 82, 84, as shown in FIG. 4. Specifically, an inner surface 103 of the exterior wall 102 is interconnected with an outer surface 104 of the wall 82 that is positioned opposite the inner surface 94, and with an outer surface 106 of the wall 84 that is positioned opposite the inner surface 96. Opposite ends 108, 110 of the exterior wall 102 extend radially inward toward the knob axis 35 to interconnect with the outer surfaces 104, 106 of the walls 82, 84. The inner surface 103 is spaced from and positioned radially outward of the outer surfaces 104, 106 of the walls 82, 84 between the ends 108, 110.

Referring still to FIG. 4, interaction of the indexing features 52 of the endbell 44 and the cantilevered arms 98, 100 of the knob 34 will now be described. In each of the mode positions 36 of the knob 34, the cantilevered arms 98, 100 are engaged with one of the protrusions 78 so that interference exists between the one of the protrusions 78 and the arms 98, 100. Four protrusions 78 are illustratively provided to establish interference with the arms 98, 100 in each of the four mode positions 36, and therefore each of the protrusions 78 corresponds to a specific mode position 36. When the knob 34 is rotated to one of the mode positions 36, the interference causes the arms 98, 100 to be deflected radially outward away from the axis 35. Such deflection is detectable by the user touching the knob 34, and as such, the protrusions 78 and the arms 98, 100 provide haptic feedback to the user indicating the positional state of the knob 34.

Referring still to FIG. 4, interaction of the piloting features 50 of the endbell 44 and the control knob 34 will now be described. In each of the mode positions 36 of the knob 34, the piloting surface 68 of the endbell 44 is engaged with the inner surfaces 94, 96 of the knob 34 to support the knob 34 for rotation about the axis 35. Additionally, as the knob 34 is rotated between each of its mode positions 36, the piloting surface 68 is engaged with the inner surfaces 94, 96 to guide rotation of the knob 34 between the positions 36. When the knob 34 has been rotated to its clockwise-most mode position 36CW (see FIG. 2), the knob 34 is engaged with the rotational stop 72 to prevent the knob 34 from further rotation in the clockwise direction indicated by arrow CW. When the knob 34 has been rotated to its counterclockwise-most mode position 36 CCW (see also, FIG. 2), the knob 34 is engaged with the rotational stop 70 to prevent the knob 34 from further rotation in the counterclockwise direction indicated by arrow CCW.

In some embodiments, rather than being provided as four protrusions (e.g., the four protrusions 78), the indexing features 52 of the endbell 44 may be provided as four arms like the cantilevered arms 98, 100. In such embodiments, the control knob 34 may include two protrusions (i.e., like the protrusions 78) rather than two cantilevered arms (i.e., like the arms 98, 100) that are deflectable to provide haptic feedback to the user indicating the positional state of the knob 34.

In some embodiments, the piloting feature 50 (i.e., the piloting surface 68) of the endbell 44 may engage the exterior wall 102 of the control knob 34 rather than the interior walls 82, 84. In such embodiments, the interior walls 82, 84 may be removed, and the cantilevered arms 98, 100 may be directly connected to the exterior wall 102 rather than the interior walls 82, 84.

In some embodiments, the piloting feature 50 (i.e., the detents 70, 72) of the endbell 44 may be embodied as a slot that is configured to receive a corresponding feature (e.g., a key) of the control knob 34 as the control knob 34 is rotated between the mode positions 36. The opposite ends of the slot may constrain rotation of the control knob 34 similar to the detents 70, 72.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A hand-held power tool comprising:
a housing assembly supporting an electric motor having a rotor configured to rotate when the electric motor is supplied with power;
an output spindle protruding from an output end of the housing assembly;
wherein the output spindle is functionally coupled to the rotor such that the output spindle rotates in response to a rotation of the rotor;
a motor endbell located on the housing assembly adjacent the electric motor and opposite the output spindle;
a user interface located on the motor endbell opposite the output spindle;
wherein the user interface is configured to select one of a plurality of modes of operation of the hand-held power tool to regulate the power supplied to the electric motor;
wherein the user interface includes a control knob accessible from exterior of the housing assembly;
wherein the control knob is rotatable about a knob axis to a plurality of mode positions that controls a plurality of operation modes;
wherein the control knob includes a lever that is configured to be pivoted by a hand;
wherein the motor endbell further includes piloting features located adjacent to and interact with the control knob to guide rotation of the control knob relative to the housing assembly about the knob axis to the plurality of mode positions;
wherein the piloting features include an arcuate guide about which the control knob rotates such that the control knob cooperatively defines the shape of the arcuate guide;
wherein the motor endbell further includes indexing features located on the arcuate guide as a plurality of selective stops;
wherein each of the plurality of selective stops is configured to interact with at least one arm on the control knob to provide haptic feedback when the control knob is rotated to each of the plurality of selective stops to define the plurality of mode positions which indicate positional states of the control knob corresponding to the plurality of operation modes;
wherein the control knob includes an arcuate exterior wall that extends at least partway around the knob axis and is connected to first and second interior walls, wherein an inner surface of the arcuate exterior wall is also connected to an outer surface of the first interior wall, and to an outer surface of the second interior wall, wherein opposite ends of the arcuate exterior wall extend radially inward toward the knob axis to connect to the outer surfaces of the first and second interior walls, respectively, and wherein the inner surface of the arcuate exterior wall is spaced apart from and positioned radially outward of the outer surfaces of the first and second interior walls between the opposite ends of the arcuate exterior wall.

2. The hand-held power tool of claim 1, wherein the at least one arm is a plurality of arms.

3. The hand-held power tool of claim 1, wherein the plurality of selective stops are a plurality of detents.

4. The hand-held power tool of claim 1, wherein the motor endbell is configured to position the rotor relative to a stator of the electric motor.

5. The hand-held power tool of claim 1, wherein the arcuate guide of the motor endbell further includes two rotational stops with the plurality of selective stops located between the two rotational stops.

6. The hand-held power tool of claim 3, wherein the arcuate guide is circular.

7. The hand-held power tool of claim 6, wherein the plurality of detents interconnects with and extends radially outward from the knob axis, and wherein the plurality of detents are spaced apart from each other.

8. The hand-held power tool of claim 6, wherein the arcuate guide includes a reduced radius section with respect to the knob axis at a location adjacent the plurality of detents.

9. The hand-held power tool of claim 4, wherein the knob axis is located parallel to an axis of rotation of the motor.

10. The hand-held power tool of claim 4, wherein the knob axis is located coincident to an axis of rotation of the rotor.

11. The hand-held power tool of claim 1, wherein the control knob is also located adjacent to a cap configured to shroud an interior space at an end of the hand-held power tool opposite the output end, wherein the control knob is rotatable relative to the cap to the plurality of mode positions.

12. The hand-held power tool of claim 1, wherein the control knob is rotatable to select one of the plurality of operation modes to regulate a maximum power supplied to the electric motor when a trigger, spaced apart from the control knob, is depressed.

13. The hand-held power tool of claim 1, wherein the plurality of operation modes are selected from a group consisting of a first power level, a second power level that is greater than the second power level, a third power level which is greater than the second power level, and a fourth power level that is greater than the third power level.

14. The hand-held power tool of claim 1, wherein the control knob further includes an interior cavity, wherein the piloting and indexing features of the endbell are received in the interior cavity.

15. The hand-held power tool of claim 1, wherein the at least one arm are first and second arms, each configured to engage one of the selective stops that define the plurality of mode positions for the control knob to provide feedback indicating the positional state of the control knob at one of the plurality of operation modes.

16. The hand-held power tool of claim 15, wherein the first and second arms are cantilevered arms coupled to the control knob and extend radially inward therefrom toward the knob axis, wherein when the control knob is rotated to one of the plurality of mode positions, wherein interference causes the first and second arms to be deflected radially outward away from the knob axis such that the deflection is detectable by the hand touching the control knob, which provide the haptic feedback indicating the positional state of the control knob.

17. A hand-held power tool comprising:
a housing assembly supporting an electric motor having a rotor configured to rotate when the electric motor is supplied with power;
an output spindle protruding from an output end of the housing assembly;
wherein the output spindle is functionally coupled to the rotor such that the output spindle rotates in response to a rotation of the rotor;
a motor endbell located on the housing assembly adjacent the electric motor and opposite the output spindle; and
a user interface located on the motor endbell opposite the output spindle;
wherein the user interface is configured to select one of a plurality of modes of operation of the hand-held power tool to regulate power supplied to the electric motor;
wherein the user interface includes a control knob having a knob axis and accessible from exterior of the housing assembly; and
wherein the control knob includes an arcuate exterior wall that extends at least partway around the knob axis and is connected to first and second interior walls, wherein an inner surface of the arcuate exterior wall is also connected to an outer surface of the first interior wall, and to an outer surface of the second interior wall, wherein opposite ends of the arcuate exterior wall extend radially inward toward the knob axis to connect to the outer surfaces of the first and second interior walls, respectively, and wherein the inner surface of the arcuate exterior wall is spaced apart from and positioned radially outward of the outer surfaces of the first and second interior walls between the opposite ends of the arcuate exterior wall.

18. The power tool of claim 17, wherein:
the motor endbell further includes an arcuate guide and indexing features located on the arcuate guide as a plurality of selective stops which indexing features interact with the control knob to provide haptic feedback when the control knob is rotated.

* * * * *